DAVID STUART & LEWIS BRIDGE.
Improvement in Base-Burning Fireplace-Heaters.
No. 4,387. Reissued May 16, 1871.
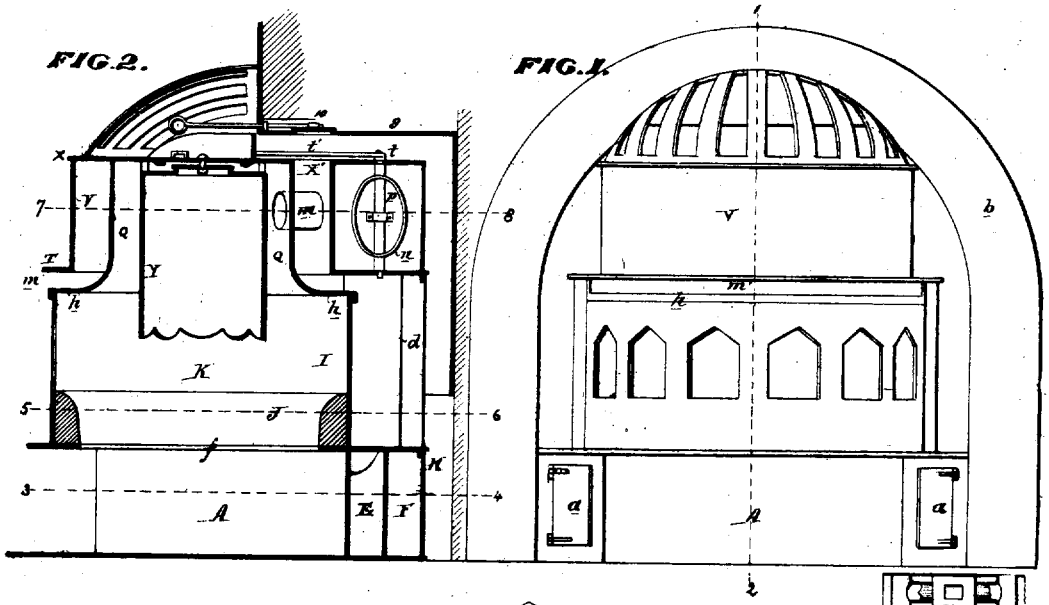
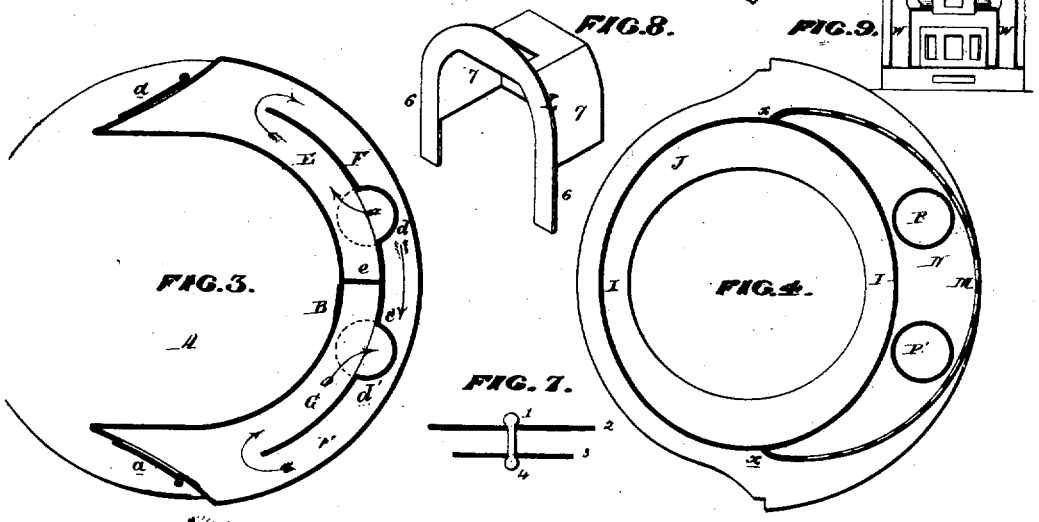
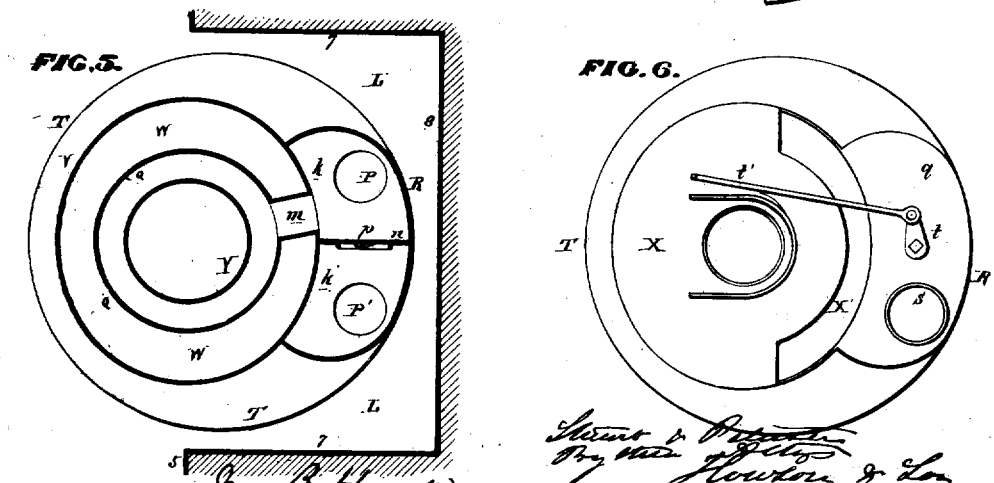
WITNESSES { Jno. B. Harding
John Parker
Stuart & Bridge
By their Attys
Howson & Son
AM. PHOTO-LITHOGRAPHIC CO. N.Y. (OSBORNE'S PROCESS.)

United States Patent Office.

DAVID STUART AND LEWIS BRIDGE, OF PHILADELPHIA, PENNSYLVANIA, ASSIGNORS TO DAVID STUART AND RICHARD PETERSON.

Letters Patent No. 79,275, dated June 23, 1868; reissue No. 3,608, dated August 17, 1869; reissue No. 4,387, dated May 16, 1871.

IMPROVEMENT IN BASE-BURNING FIRE-PLACE HEATERS.

The Schedule referred to in these Letters Patent and making part of the same.

We, DAVID STUART and LEWIS BRIDGE, of Philadelphia, county of Philadelphia, State of Pennsylvania, have invented certain Improvements in Base-burning Fire-place Stoves, for which Letters Patent were granted to DAVID STUART and RICHARD PETERSON, as assignees, June 23, 1868, and reissued August 17, 1869, of which the following is a specification.

*Nature and Object of the Invention.*

Our invention consists of a base-burning fire-place stove, constructed in the peculiar manner fully described hereafter, with the view of obtaining an extended heating-surface for the air admitted to the stove, which stove is of small dimensions compared with ordinary stoves of this class.

A further object of our invention is to so control the heated air from the stove, that it can be readily directed into the room containing the stove, or into an upper room or rooms.

*Description of the Accompanying Drawing.*

Figure 1 is a front view of our improved fire-place stove;

Figure 2, a vertical section on the line 1 2, fig. 1;

Figure 3, a sectional plan on the line 3 4, fig. 2;

Figure 4, a sectional plan on the line 5 6, fig. 2;

Figure 5, a sectional plan on the line 7 8, fig. 2;

Figure 6, a top view of the stove;

Figure 7, a view of the covers of the feeder;

Figure 8, a perspective view of the casing to fit in the fire-place and receive the stove; and Figure 9, a diagram, showing a front view of a fire-place stove of the ordinary construction.

The base of the stove will be best observed in figs. 1 and 3, where—

A represents the lower plate, the latter being, in the present instance, of an oval form; and to this plate are fitted the vertical curved plates B, C, and D, the plates B and D being connected together at their ends by the plates *a a*, in each of which is an opening, provided with a sliding door, shown by red lines.

The plate C is shorter than the other curved plates, and has two semicircular projections, *d* and *d'*, between which is a partition, *e*, extending across the space between the plates B and C.

It may be stated, in the outset, that the products of combustion pass downward into the semicircular projection *d*, into the flue E, thence, in the direction of the arrows, into and through the flue F, and thence into the flue G, to the semicircular projection *d'*, as shown in fig. 3.

The upper edges of the plates B, C, D, and *a a* are fitted to the horizontal plate H, on which rests the casing I, inclosing the fire-chamber K and the fire-pot J and grate *f*.

At the rear of the casing I is a curved plate, M, secured to the said casing I at *x x*, so as to form the crescent-shaped air-chamber N, in which are two pipes, P and P', the former communicating with the interior of the semicircular projection *d*, and the latter with the semicircular projection *d'*, above referred to. This plate M is so perforated as to admit a plentiful supply of cold air to the chamber N.

To the upper edge of the casing I is fitted the horizontal flange *h* of the casing Q, which is contained within an exterior casing, V, the latter being fitted to a plate, T, which rests on the curved plate M, but is so far above the flange *h* of the casing Q as to leave a space, *m'*, for the admission of air to the space W between the casings Q and V.

At the rear of the casing V is a curved plate, R, which, with the said casing, incloses a space separated, by a partition, *n*, into two compartments, *k* and *k'*, with the former of which the fire-chamber communicates through a tube, *m*. (See fig. 5.)

The partition *n* between the two compartments has an opening provided with a throttle-valve, *p*, the spindle of which passes through a cover-plate, *q*, and is provided with an arm, *t*, to be operated by a rod, *t'*, fig. 6.

In this cover-plate is an opening, *s*, to which is fitted the pipe for conveying the product of combustion from the compartment *k'* to the chimney.

It should be here stated that the pipe P communicates with the compartment *k*, and the pipe P' with the compartment *k'*. (See fig. 5.)

A horizontal plate, X, is fitted to the upper edges of the casings V and Q, this plate being of the form represented in fig. 6, so as to leave an opening, X', through which the air heated in the chamber W, between the casings Q and V, can escape.

From the plate X is suspended the fuel-reservoir or feeder Y, which terminates below in the fire-chamber, this feeder having at the top an opening for the admission of fuel, which is passed through an outer opening in the plate X above.

The cover consists of two disks, 2 and 3, the former being larger in diameter than the latter, and resting on the plate X, while the disk 3 rests on the top of the feeder below the said plate.

The two disks are so connected together by a central pin, 4, that each disk will be certain to rest on its proper bearing.

The products of combustion can pass between these two covers—that is, between the top of the feeder and under side of the plate X, thus imparting heat, which would be lost if the feeder extended to the said plate X and a single cover only were used.

In fig. 5 the line 5 represents the face of a wall, against which bears the arched plate or frame 6, figs. 1 and 8, and to the rear of this plate is secured a casing, L, composed of side plate 7 7 and rear plate 8, the side plates meeting the top plate 9, which is made flat, as shown in the perspective view, fig. 8.

This casing is fitted into the chimney-place L′ made in the wall 5, and forms the recess, into which one-half or thereabouts of the stove projects, a chamber being formed between the top plate X of the stove and the top 9 of the casing, for the heated air prior to its distribution into the room containing the stove, or into the rooms above.

The pipe P′ passes through the top 9 of the casing into the flue for conveying the products of combustion to the chimney-flue, and in the top 9 of the said casing is also an opening provided with a suitable valve or damper, 10, which may be so adjusted that the heated air shall be directed to the passage leading to upper rooms, or excluded from the said passage and projected outward into the room containing the stove; or the damper may be so adjusted that the heated air can be distributed both into the lower and upper rooms.

When the valve *p* is closed the products of combustion will pass from the fire-chamber through the opening *m*, fig. 5, into the compartment *k*, thence down the pipe P into the passage F, fig. 3, along the passage F into the passage G, thence through the pipe P′ into the compartment *k′*, and thence to the chimney. On opening the valve *p*, however, the products of combustion will pass directly from the chamber *k*, through the opening in the partition *n*, into the chamber *k′*, and thence to the chimney.

The air admitted through the casing M at the rear of the stove into the chamber N is heated by intimate contact with the outer surfaces of these pipes P and P′, and by contact with the back of the casing I, before it passes off through the opening X′.

Another and independent volume of air is heated in the chamber W, having been admitted thereto through the opening *m′* in front of the stove, the air thus heated meeting the other volume of air and passing with the same through the said opening X′.

On the top of that portion of the stove which projects into the room is a plate, H′, made in the form of a section of a hollow sphere, the plate which rests on the top plate X of the stove and against the wall 5 having openings for the passage of heated air into the room.

The main advantages of our improved stove will be most apparent by comparing it to the ordinary well-known fire-place stove, of which a view on a small scale is shown in fig. 9.

In stoves of this class there are two pipes, *w w*, one on each side of the main body of the stove, the products of combustion from which pass down one pipe and up the other to the chimney.

Owing to these external pipes the stove occupies an extended space, and is frequently too large for an ordinary chimney-place; but by constructing a stove in the manner described, and by arranging the pipes for the passage of the products of combustion to the chimney within the stove itself, the latter may be made of a convenient size, and this without any loss of heat. Moreover, our improved stove can be arranged to project further into the room than ordinary fire-place stoves, and, consequently, the room is more thoroughly heated than when the stove is moved far back into the fire-place.

Another advantage of our improved stove is the situation of the pipe *p′* for the escape of the products of combustion, this pipe being conveniently arranged for direct communication, without elbow-pipes, to the flue of the chimney.

In ordinary fire-place stoves it is usual to supply the magazine with fuel from the front, an arrangement which demands a short magazine.

By introducing the fuel through the top of the stove a deeper magazine may be used, and this long feeder enables us to form an air-chamber, W, which greatly increases the heating properties of the stove.

Another important feature of our invention is the formation of a general hot-air chamber between the top of the stove and the top of the casing, so that this air may pass directly outward into the room immediately above the stove, thereby dispensing with the hot-air register, which has been usually placed in the wall above the chimney-piece of a fire-place stove.

The valve or damper 10 is another valuable improvement, whereby the heated air may be directed to or excluded from the upper room without the necessity of going to that room for the purpose of adjusting the registers therein.

*Claims.*

1. The base of the stove inclosing the passages E, F, and G, arranged and communicating with pipes or passages P and P′, substantially as described.

2. Two or more pipes or passages, P and P′, arranged within the outer casing of a fire-place stove for conveying the products of combustion to the chimney and for heating the air admitted to the space within the said outer casing, all substantially as and for the purpose herein set forth.

3. The said pipes or passages P and P′, in combination with the compartments *k* and *k′* and the valved partition between the same.

4. The double cover, consisting of plates 2 and 3, one for fitting to the top of the stove and the other to the top of the feeder, and so arranged that the products of combustion can pass between them.

5. In a fire-place stove, a valve or damper, 10, arranged, substantially as described, so as to direct the heated air into the passage leading to an upper room or rooms, or to exclude the heated air from the said passage and direct it across the top of the stove into the room containing the latter, substantially as set forth.

In testimony whereof we have signed our names to this specification in the presence of two subscribing witnesses.

DAVID STUART.
LEWIS BRIDGE.
RICHARD PETERSON.

Witnesses:
WM. A. STEEL,
F. B. RICHARDS.